June 8, 1943.    H. GAMACHE    2,321,289
PARING IMPLEMENT
Filed Dec. 1, 1942
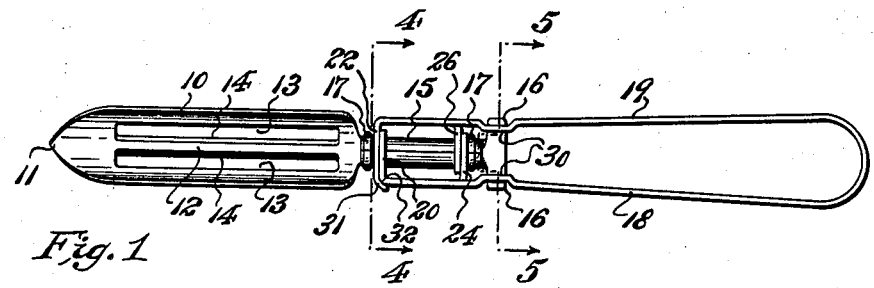
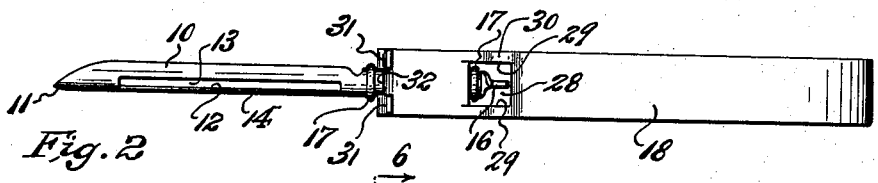
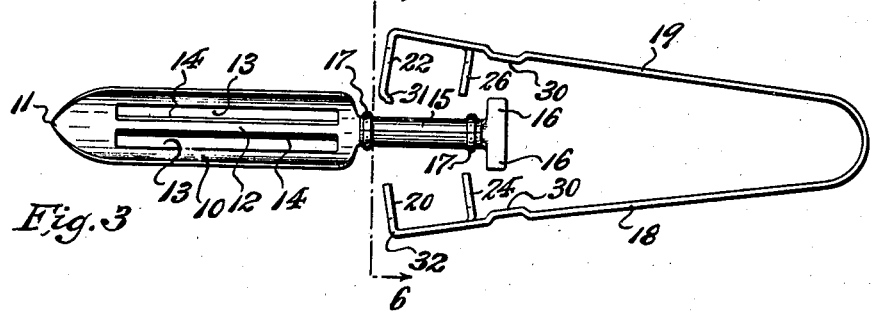
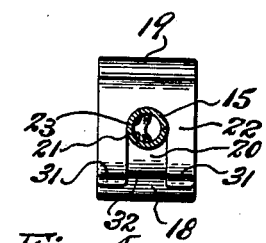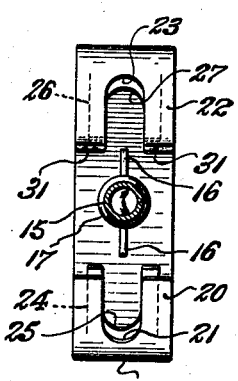
INVENTOR.
Homer Gamache,
BY George D. Richards
ATTORNEY.

Patented June 8, 1943

2,321,289

UNITED STATES PATENT OFFICE 2,321,289

PARING IMPLEMENT

Homer Gamache, Newark, N. J., assignor of one-half to James V. Finaldi, Newark, N. J.

Application December 1, 1942, Serial No. 467,514

4 Claims. (Cl. 30—279)

This invention relates to an improved implement for paring or peeling vegetables, fruit or the like.

The invention has for an object to provide a paring implement comprising a blade or cutter and a handle means therefor, including novel means for pivotally supporting the blade or cutter in axial extension from the handle means and for oscillation about its longitudinal axis, and further including means for limiting the oscillatory pivotal movement of said blade or cutter.

The invention has for another object to provide a paring implement, characterized as above stated, wherein the handle means is detachable from the blade or cutter, whereby to permit separation of these parts so as to facilitate thorough cleansing thereof after use; and, to this end, including a novel expandable handle structure comprising opposed, divergently resilient strip metal arms, each provided with bifurcate bearing lugs to embrace and journal the shank of the blade or cutter when the arms are closed together, and means for releasably holding said arms closed together in blade supporting relation.

Other objects of this invention, not at this time more particularly enumerated, will be understood from the following detailed description of the same.

An illustrative embodiment of this invention is shown in the accompanying drawing, in which:

Fig. 1 is a plan view of a paring implement according to this invention, showing its blade or cutter and handle means operatively connected for use of the implement; Fig. 2 is a side elevational view of the same; and Fig. 3 is a plan view, showing the handle means released and expanded for detachment from the blade or cutter.

Fig. 4 is a cross sectional view, taken on line 4—4 in Fig. 1, but drawn on an enlarged scale; Fig. 5 is a cross sectional view, taken on line 5—5 in Fig. 1, but drawn on an enlarged scale; and Fig. 6 is a cross sectional view, taken on line 6—6 in Fig. 3, and also drawn on an enlarged scale.

Similar characters of reference are employed in all of the hereinabove described views, to indicate corresponding parts.

Referring to the drawing, the reference character 10 indicates blade or cutter of the implement which is made of sheet metal, the same comprising an elongated body of concavo-convex cross sectional shape, which terminates at its forward free end in a pointed extremity 11, adapted for use as a gouge for removing undesired parts from the body of a vegtable or fruit to be peeled. Said blade or cutter body 10 is provided with a longitudinally extending, centrally disposed cutter bar 12, bordered on opposite sides thereof by clearance slots 13. The opposite edges of said cutter bar 12 are chamfered and sharpened to provide selectively usable cutting edges 14.

At its rearward end, the blade or cutter is wrought into an axially extending tubular shank 15, the free end of which is opened out and shaped to provide a cross bar providing laterally and oppositely projecting stop arms 16. Preferably the shank 15 is provided with spaced annular enlargements or beads 17 which cooperate with handle bearing portions, to be subsequently described, for limiting longitudinal play of the blade or cutter, when the same is operatively attached to its handle.

The handle means of the paring implement, in a preferred form thereof as shown, comprises a strip of springy metal doubled upon itself into a substantially U-shape so as to provide a pair of opposed, divergently resilient arms 18 and 19, thus providing a laterally expandible handle member. The free end portion of the arm 18 is turned inwardly to provide an angular bifurcate bearing lug 20 having an indenting outwardly open bearing slot 21. In like manner, the free end portion of the arm 19 is turned inwardly to provide an angular bifurcate bearing lug 22 adapted to oppose and outwardly overlap the bearing lug 20 of the opposite arm 18, when the arms 18 and 19 are in normal closed together relation, and said bearing lug 22 is also provided with an indenting outwardly open bearing slot 23.

Struck out of and inwardly turned from the arm 18, so as to be rearwardly spaced from its outer bearing lug 20 is an inner angular bifurcate bearing lug 24 having an indenting outwardly open bearing slot 25. In like manner, struck out of and inwardly turned from the arm 19, so as to be rearwardly spaced from its outer bearing lug 22 is an inner angular bifurcate bearing lug 26 adapted to oppose and outwardly overlap the inner bearing lug 24 of the opposite arm 18, when the arms 18 and 19 are in normal closed together relation, and said inner bearing lug 26 is also provided with an outwardly open indenting bearing slot 27.

Where the inner bearing lugs 24 and 26 are struck out of the bodies of the handle arms 18 and 19, through openings 28 are left in each said arm. When the arms 18 and 19 are normally closed together, the extremities of the stop arms 16 of the blade or cutter shank 15 respectively extend into and lie within the limits of said respective openings 28, and, as a consequence, will, when the blade or cutter oscillates about its longitudinal axis, strike either one or the other of the side margins 29 of said openings, whereby to limit the pivotal oscillatory movement of the blade or cutter. Preferably, the handle arms 18 and 19, where provided with the openings 28, are inwardly depressed to form inwardly offset portions 30 for more effective arresting engagement of the stop arms 16, while at the same time permitting the extremities of the latter to lie within the general planes of the outer surfaces of said handle arms 18 and 19.

Means are provided for releasably latching the handle arms 18 and 19 in normal closed together relation, whereby the pairs of opposed bifurcate bearing lugs 20—22 and 24—26 straddlingly close upon opposite sides of the blade or cutter shank 15 so as to journal the same for pivotal oscillation of the blade or cutter body about its longitudinal axis. The means for so releaseably latching said arms 18 and 19 together may optionally take any suitable form, but illustrative of one satisfactory form and construction thereof, as shown, comprises latch-nosings 31 formed in connection with the free end portions of the bearing lug 22 of the arm 19, and which are adapted to spring and latch over the shoulder 32 formed by the juncture of the bearing lug 20 with the arm 18.

From an inspection of Figs. 1, 2 and 4, it will be obvious that, when the blade or cutter shank 15 is interposed between the handle arms 18 and 19, and the latter are thereupon closed and latched together, the opposed bearing lugs 20—22 and 24—26 will embrace opposite sides of said shank 15, adjacent the beads 17 of the latter, whereby to mount the blade or cutter body 10 on the handle member, subject to pivotal oscillation about its longitudinal axis, as limited by the stop arms 16 then entered between the stop sides 29 of the handle arm openings 28. In the use of the implement when paring a vegetable or the like, the pivotal movement of the blade or cutter will allow its blade bar to follow the contour of the vegetable or the like, so as to pare therefrom a peel without undue waste; the severed peel clearing itself through the slot 13 adjacent the particular cutting edge 14 of the cutter bar 12 which is employed in such paring operation. The implement may be moved in either direction, or may be used and applied by either the right or left hand of the operator, the cutting edges 14 of the cutter bar 12 being accordingly selectively usable.

After use of the implement, the handle arms 18 and 19 may be released from their normal latched together relation, whereby the same, due to their divergent resiliency, will spread apart, as shown in Figs. 3 and 6, thus releasing the blade or cutter body 10 for removal, and subsequent separate and thorough cleansing. The separated open handle member renders all its parts readily accessible and, therefore, likewise subject to thorough cleansing. It will thus be understood that the implement may be easily kept in clean and sanitary condition.

Having now described my invention, I claim:

1. A paring implement comprising a blade body having a shank axially extending from its rear end, said shank terminating in a cross bar providing oppositely extending stop projections, a handle member including laterally spaced arms having means to journal said shank for supporting said blade body subject to pivotal oscillation about its longitudinal axis, and said handle member arms having openings therethrough to receive the end portions of said stop projections, whereby engagement of the side margins of said openings by said stop projections functions to limit pivotal oscillation of the blade body.

2. A paring implement comprising a blade body having a shank axially extending from its rear end, a detachable handle member including laterally spaced, divergently resilient arms, said arms having bifurcate bearing lugs angularly projecting inwardly therefrom to embrace and journal said shank to support said blade body subject to pivotal oscillation about its longitudinal axis when said handle member arms are closed together in attached relation to the blade body, and said handle member arms having cooperative means for releaseably retaining the same closed together in attached relation to the blade body.

3. A paring implement comprising a blade body having a shank axially extending from its rear end, a detachable handle member including laterally spaced, divergently resilient arms, said arms having bifurcate bearing lugs angularly projecting inwardly therefrom to embrace and journal said shank to support said blade body subject to pivotal oscillation about its longitudinal axis when said handle member arms are closed together in attached relation to the blade body, said handle member arms having cooperative means for releaseably retaining the same closed together in attached relation to the blade body, and means for limiting the pivotal oscillation of the blade body when attached to said handle member.

4. A paring implement comprising a blade body having a shank axially extending from its rear end, said shank terminating in a cross bar providing oppositely extending stop projections; a detachable handle member including laterally spaced, divergently resilient arms, said arms having bifurcate bearing lugs angularly projecting inwardly therefrom to embrace and journal said shank to support said blade body subject to pivotal oscillation about its longitudinal axis when said handle arms are closed together in attached relation to the blade body, said handle member arms having cooperative means for releaseably retaining the same closed together in attached relation to the blade body, and said handle member arms having openings therethrough to receive the end portions of said stop projections, whereby engagement of the side margins of said openings by said stop projections functions to limit the pivotal oscillation of said blade body.

HOMER GAMACHE.